US008477929B2

(12) United States Patent
Fang et al.

(10) Patent No.: US 8,477,929 B2
(45) Date of Patent: Jul. 2, 2013

(54) METHOD, DEVICE AND SYSTEM FOR LINE MANAGEMENT

(75) Inventors: Liming Fang, Shenzhen (CN); Cheng Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 412 days.

(21) Appl. No.: 12/847,111

(22) Filed: Jul. 30, 2010

(65) Prior Publication Data

US 2010/0296648 A1    Nov. 25, 2010

Related U.S. Application Data

(63) Continuation of application No. PCT/CN2009/070124, filed on Jan. 13, 2009.

(30) Foreign Application Priority Data

Feb. 4, 2008    (CN) .......................... 2008 1 0006274

(51) Int. Cl.
*H04M 9/00*    (2006.01)

(52) U.S. Cl.
USPC .......... 379/414; 379/1.04; 379/15.03; 379/22

(58) Field of Classification Search
USPC .................. 379/1.01, 1.04, 15.03, 22, 22.01, 379/22.08, 24, 27.01, 28, 32.04, 417, 416
See application file for complete search history.

(56) References Cited

U.S. PATENT DOCUMENTS

| 6,339,706 B1 | 1/2002 | Tillgren et al. | |
|---|---|---|---|
| 7,302,379 B2 * | 11/2007 | Cioffi et al. | ..................... 703/20 |
| 2003/0123560 A1 | 7/2003 | Jacobsen et al. | |
| 2005/0123027 A1 | 6/2005 | Cioffi et al. | |
| 2005/0123028 A1 | 6/2005 | Cioffi et al. | |
| 2006/0039456 A1 | 2/2006 | Bostoen et al. | |
| 2006/0133534 A1 * | 6/2006 | Verlinden et al. | ............. 375/285 |
| 2007/0036340 A1 * | 2/2007 | Rhee et al. | ............... 379/399.01 |
| 2007/0280334 A1 | 12/2007 | Lv et al. | |
| 2008/0031313 A1 | 2/2008 | Oksman | |

(Continued)

FOREIGN PATENT DOCUMENTS

| CN | 1390347 | 1/2003 |
|---|---|---|
| CN | 1741406 | 3/2006 |
| CN | 1961530 | 5/2007 |
| CN | 101083553 | 12/2007 |

OTHER PUBLICATIONS

Wei Yu et al., "Multiuser Water-filling in the Presence of Crosstalk", Information Theory and Applications Workshop, 2007, IEEE, PI, Jan. 1, 2007, pp. 414-420.

(Continued)

*Primary Examiner* — Olisa Anwah
(74) *Attorney, Agent, or Firm* — Staas & Halsey LLP (57) ABSTRACT

A method for line management includes: acquiring running parameters of a subscriber line; computing a transmitting power spectral density, PSD, and reference virtual noise of the subscriber line according to the running parameters; activating the subscriber line according to the transmitting PSD and the reference virtual noise. A device and system for line management are provided correspondingly. Reference virtual noise needed by virtual noise technology is set rationally according to the information provided by dynamic spectrum management, DSM, Level 2 algorithm. The utilization of the virtual noise technology improves the line stability under the DSM Level 2 algorithm, and has an effect of optimizing the subscriber line.

8 Claims, 4 Drawing Sheets

U.S. PATENT DOCUMENTS

| | | | |
|---|---|---|---|
| 2010/0246805 A1* | 9/2010 | Hausman et al. | 379/417 |
| 2010/0254528 A1* | 10/2010 | Wei et al. | 379/406.06 |
| 2011/0122935 A1* | 5/2011 | Lv | 375/224 |
| 2011/0129007 A1* | 6/2011 | Schwager et al. | 375/224 |
| 2011/0211624 A1* | 9/2011 | Van de Wiel et al. | 375/222 |
| 2012/0075984 A1* | 3/2012 | Cendrillon et al. | 370/201 |
| 2012/0275576 A1* | 11/2012 | Wei | 379/32.04 |

OTHER PUBLICATIONS

Lui R et al., "Low-complexity near-optimal spectrum balancing for digital subscriber lines", Communications, 2005, ICC 2005., 2005 IEEE International Conference on Seoul, Korea, May 16-20, 2005, Piscataway, NJ, vol. 3, pp. 1947-1951.

Written Opinion of the International Searching Authority mailed Mar. 26, 2009 in corresponding International Patent Application PCT/CN2009/070124.

European Search Report dated Jun. 16, 2011 in corresponding European Patent Application 09709134.2.

Cioffi, J. et al., *DSM Level 2: Polite and Efficient Access-Network Throughout Increase*, ATIS Committee NIPP-NAI, Working Group NAI (DSL Access), Vancouver, Canada, Nov. 12, 2007, pp. 1-10.

Office Action, mailed Mar. 21, 2012, in corresponding Chinese Application No. 200810006274.6 (9 pp.).

International Search Report, mailed Mar. 26, 2009, in corresponding PCT/CN2009/070124 (6 pp.).

Cendrillon, R. et al., *Iterative Spectrum Balancing for Digital Subscriber Lines* (5 pp.).

Kun Wang, "The key technology crosstalk cancellation in VDSL2", Modern Science and Technology of Telecommunications, No. 3, Mar. 2007, pp. 52-58.

* cited by examiner

METHOD, DEVICE AND SYSTEM FOR LINE MANAGEMENT

CROSS-REFERENCE TO RELATED APPLICATIONS

This application is a continuation of International Application No. PCT/CN2009/070124, filed on Jan. 13, 2009, which claims priority to Chinese Patent Application No. 200810006274.6, filed on Feb. 4, 2008, both of which are hereby incorporated by reference in their entireties.

FIELD OF THE TECHNOLOGY

The present invention relates to the field of communication, and more particularly to a method, device and system for line management.

BACKGROUND OF THE INVENTION

At present, a number of second-generation dynamic spectrum management, DSM level2, algorithms exist, such as optimum spectrum balancing, OSB, iterative water-filling, IWF, and Iterative spectrum balancing, ISB. With the DSM level2 algorithm, a transmitting power spectral density, PSD, of each subscriber line that makes the overall PSD optimal can be obtained. The DSM level2 algorithm is based on an assumption that all subscriber lines are activated at the same time; however, if multiple subscribers are activated dynamically, that is, the activations of various subscriber lines are performed in a certain sequence, PSD obtained through this algorithm tends to match poorly. For example, for a first activated subscriber line, since it is not affected by the crosstalk of the other activated subscriber lines or only affected by the crosstalk of some of the other activated subscriber lines, the noise floor level of it is relatively slow. The subscriber line uses the existing water-filling algorithm to perform bit loading. According to bit loading formula:

$$b_k^n = \log_2\left(1 + \frac{|h_k^{n,n}|^2 s_k^n}{\sum_{m \neq n} |h_k^{n,m}|^2 s_k^m + \sigma_k^n}\right)$$

The obtained $b_k^n$ will be larger obviously. The reflected effect is that the activation rate is relatively larger with respect to the management target.

In the formula, $b_k^n$ represents the number of bit loading for the $k^{th}$ subcarrier of line n, $s_k^n$ and $s_k^m$ respectively represent the transmission power of the $k^{th}$ subcarrier of line n and line m, $h_k^{n,n}$ represents the direct channel for the $k^{th}$ subcarrier of line $h_k^{n,m}$ represents the crosstalk channel of line m to line n on the $k^{th}$ subcarrier, and $\sigma_k^n$ represents the silent noise on the $k^{th}$ subcarrier of line n.

With the continuous activation of the remaining subscriber lines, the crosstalk suffered by the activated subscriber lines will increase gradually, that is, the level of their noise floor will increase gradually to a reasonable level. In such case, the number of bits that can be loaded by their channels will be less than that in the activation. The margin of the subscriber line decreases gradually, thus causing instability and even re-activation of the line.

A subscriber line may be activated repeatedly until convergence, due to the presence of margin, this convergence process may be very long, and the subscriber line even needs to be manually activated circularly to achieve a balance state achieving the management target.

SUMMARY OF THE INVENTION

The present invention is directed to a method, device and system for line management, so as to improve the stability of the line.

The method, device and system for line management provided by the present invention are implemented through the following technical solutions.

The present invention provides a method for line management, which includes the following steps.

Running parameters of a subscriber line are acquired.

A transmitting PSD and reference virtual noise of the subscriber line are computed according to the running parameters.

The subscriber line activates the subscriber line according to the transmitting PSD and the reference virtual noise.

In an embodiment, the present invention further provides a device for line management, which includes a parameter acquiring unit, a computing unit, and a line activating unit.

The parameter acquiring unit is adapted to acquire running parameters of a subscriber line.

The computing unit is adapted to compute transmitting PSD and reference virtual noise of the subscriber line according to the running parameters.

The line activating unit is adapted to activate the subscriber line according to the transmitting PSD and the reference virtual noise.

In an embodiment, the present invention further provides a system for line management, which includes a line managing device and line terminals.

The line managing device is adapted to acquire running parameters of the line terminals, compute transmitting PSD and reference virtual noise of a subscriber line according to the running parameters, and send the transmitting PSD and the reference virtual noise to the line terminals.

The line terminals are adapted to send the running parameters to the line managing device, receive the transmitting PSD and the reference virtual noise sent by the line managing device, and activate the line according to the transmitting PSD and the reference virtual noise.

The present invention provides a method, device and system for line management, where the value of the reference virtual noise needed by virtual noise technology is set rationally according to the information provided by DSM Level 2 algorithm, thus improving the stability of the subscriber line and optimizing the subscriber line in conjunction with the virtual noise technology and the DSM Lever 2 algorithm.

DETAILED DESCRIPTION OF THE EMBODIMENTS

The present invention provides a method, device and system for setting virtual noise, which enables the virtual noise to be set more rationally, and improves the stability of a subscriber line.

The virtual noise technology achieves the requirement of reserving noise margin by pre-setting the virtual noise of simulated crosstalk. Considering that the amplitude of crosstalk is related to the length of a subscriber line, but the length of the subscriber line is generally not known when setting the virtual noise, so a reference virtual noise is set directly at a transmitting side, which is computed according to the reference noise set at the transmitting side and a transfer function of the line.

$$Received\_Virtual\_Noise\_PSD = |H(f)|^2 \times TXREFVN$$

In the above equation, TXREFVN is the value of the reference virtual noise at the transmitting end, and $|H(f)|^2$ is a receiving PSD measured for the subscriber line.

Virtual noise technology can improve the stability, and avoid error or re-training caused by the increase of crosstalk.

For better understanding of the technical solutions of the present invention, embodiments of the present invention are described in detail below in combination with the accompanying drawings.

Figure 1:
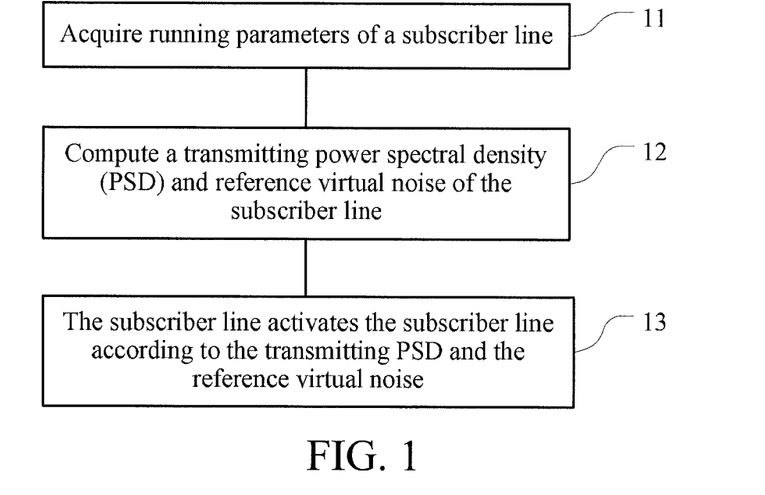
FIG. 1 is a flow chart of a method for line management according to an embodiment of the present invention.

FIG. 1 is a flow chart of a method for line management according to an embodiment of the present invention. Referring to FIG. 1, the embodiment of the method for line management includes the following steps.

In step 11, running parameters of a subscriber line are acquired, and the running parameters include a transfer function of a direct channel, a transfer function of a crosstalk channel, and a PSD of silent noise. For DSM Level2 algorithm, the transfer function of the direct channel, the transfer function of the crosstalk channel, and the PSD of silent noise for all lines are known input values. Such parameters as the transfer function of the direct channel, the transfer function of the crosstalk channel, and the PSD of silent noise may also be obtained by modeling or measuring or through subscriber line terminal.

In step 12, a transmitting PSD and reference virtual noise of the subscriber line are computed according to the running parameters.

In step 13, the subscriber line is activated according to the transmitting PSD and the reference virtual noise.

Figure 2:
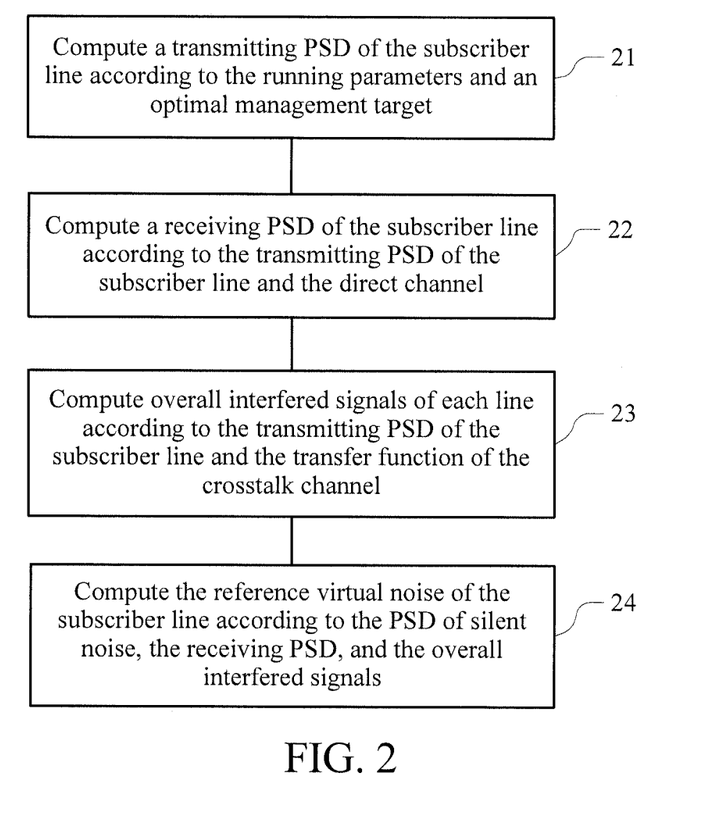
FIG. 2 is a flow chart of a method for computing reference virtual noise according to an embodiment of the present invention.

FIG. 2 is a flow chart of a method for computing reference virtual noise according to an embodiment of the present invention. Referring to FIG. 2, the method includes the following steps.

In step 21, a transmitting PSD of each subscriber line is computed with a certain algorithm according to the running parameters and a management target, where a management method by means of spectrum control such as DSM Level2 algorithm may be adopted, for example, ISB, OSB, and the like; the management target includes making the line to achieve: rate maximization, power minimization, noise margin maximization, and any one of the optimizing strategies developed by an operator, or any combination thereof.

In step 22, a receiving PSD of each subscriber line is computed according to the transmitting PSD of each subscriber line and the transfer function of the direct channel by using the above DSM Level2 algorithm.

In step 23, overall interfered signals of each subscriber line are computed according to the transmitting PSD of each subscriber line and the transfer function of the crosstalk channel by using the above DSM Level2 algorithm.

In step 24, the reference virtual noise of each subscriber is computed by using the above DSM Level2 algorithm in combination with the receiving PSD, the overall interfered signals, and the PSD of silent noise, and the process for computing and setting the reference virtual noise is described as follows.

According to the classic QAM modulation theory, the bit loading formula of a tone for the $i^{th}$ subscriber line is:

$$2^{b_i} - 1 = \frac{|H_{ii}|^2 \varepsilon_i}{\Gamma\left(\sum_{j \neq i} |H_{ij}|^2 \varepsilon_j + \sigma^2\right)}$$

In this formula, $H_{ii}$ is the transfer function of a direct channel, $H_{ij}$ is the transfer function of a crosstalk channel generated by the $j^{th}$ subscriber line to the $i^{th}$ subscriber line, $\varepsilon_i$ is the transmitting PSD of the $i^{th}$ subscriber line, $\varepsilon_j$ is the transmitting PSD of the $j^{th}$ subscriber line, $\sigma^2$ is the PSD of silent noise, and $\Gamma$ is an SNR gap. SNR gap is a normalized signal-to-noise ratio which enables the system to satisfy a certain error rate condition; meanwhile, the parameter is also related to a noise margin and an encoding gain. The noise floor (interference and noise) is the portion of the denominator in the above formula except the SNR gap.

According to the above formula, the reference virtual noise (vnPSD) of the $i^{th}$ subscriber line is computed as follows:

$$vnPSD = \frac{\sum_{j \neq i} |H_{ij}|^2 \varepsilon_j + \sigma^2}{|H_{ii}|^2}$$

Using the method for line management provided by the embodiment of the present invention to perform subscriber line activation does not consider the actual noise level at the moment of activation, instead, by computing and setting the reference virtual noise according to the method for line management provided by the embodiment of the present invention, the bit loading is controlled directly and enough signal-to-noise ratio is reserved to resist the crosstalk that is not generated yet. The actual effect is that the stability of the line is enhanced greatly, the time from convergence to optimal balance is reduced, and manual regulation is avoided.

Figure 3:
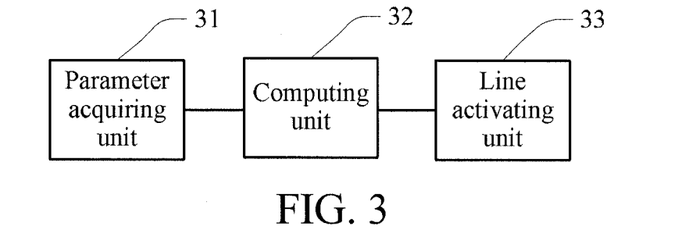
FIG. 3 is a schematic structural view of a device for line management according to an embodiment of the present invention.

The above embodiment describes in detail the method for line management and the technical effect in combination with the technical characteristics. Correspondingly, in an embodiment, the present invention further provides a device for line management. FIG. 3 is a schematic structural view of the device for line management according to the embodiment of the present invention. Referring to FIG. 3, the device for line management includes a parameter acquiring unit 31, a computing unit 32, and a line activating unit 33.

The parameter acquiring unit 31 is adapted to acquire running parameters of a subscriber line, and the running parameters include the transfer function of a direct channel, the transfer function of a crosstalk channel, and the PSD of silent noise. For the DSM Level2 algorithm, the transfer function of the direct channel, the transfer function of the crosstalk channel, and the PSD of silent noise for all subscriber lines are known input values.

The computing unit 32 is adapted to compute a transmitting PSD and reference virtual noise of the subscriber line according to the running parameters, and The line activating unit 33 is adapted to activate the subscriber line according to the transmitting PSD and the reference virtual noise.

Figure 4:
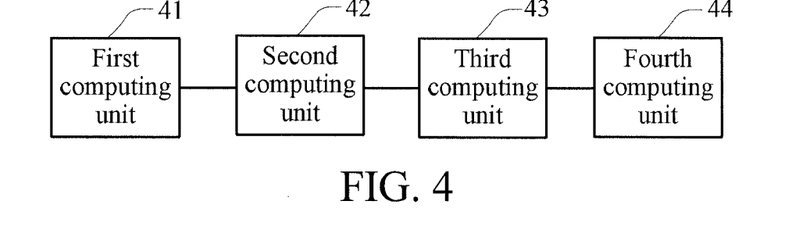
FIG. 4 is a schematic structural view of a computing unit according to an embodiment of the present invention.

In order to better achieve the object of the present invention, as shown in FIG. 4, the computing unit 32 further includes a first computing unit 41, a second computing unit 42, a third computing unit 43, and a fourth computing unit 44.

The first computing unit 41 is adapted to compute a transmitting PSD of each subscriber according to the running parameters and the management target (for example, making the subscriber line to achieve: rate maximization, power minimization, noise margin maximization, and any one of the optimizing strategies developed by an operator, or any combination thereof) by using a certain DSM Level2 algorithm (for example, ISB, OSB).

The second computing unit 42 is adapted to compute a receiving PSD of the subscriber line according to the transmitting PSD of the subscriber line and the transfer function of the direct channel by using the above DSM Level2 algorithm.

The third computing unit 43 is adapted to compute overall interfered signals of the subscriber line according to the transmitting PSD of the subscriber line and the transfer function of the crosstalk channel by using the above DSM Level2 algorithm.

The fourth computing unit 44 is adapted to compute the reference virtual noise of the subscriber line according to the PSD of silent noise, the receiving PSD, and the overall interfered signals by using the above DSM Level2 algorithm. The process for computing the reference virtual noise is described as follows.

According to the classic QAM modulation theory, the bit loading formula of a tone for the $i^{th}$ subscriber line is:

$$2^{b_i} - 1 = \frac{|H_{ii}|^2 \varepsilon_i}{\Gamma\left(\sum_{j \neq i} |H_{ij}|^2 \varepsilon_j + \sigma^2\right)}$$

In this formula, $H_{ii}$ is the transfer function of a direct channel, $H_{ij}$ is the transfer function of a crosstalk channel generated by the $j^{th}$ subscriber line to the $i^{th}$ subscriber line, $\varepsilon_i$ is the transmitting PSD of the $i^{th}$ subscriber line, $\varepsilon_j$ is the transmitting PSD of the $j^{th}$ subscriber line, $\sigma^2$ is the PSD of silent noise, and $\Gamma$ is an SNR gap. The noise floor (interference and noise) is the portion of the denominator in the above formula except the SNR gap.

According to the above formula, the reference virtual noise of the ith subscriber line is computed as follows:

$$vnPSD = \frac{\sum_{j \neq i} |H_{ij}|^2 \varepsilon_j + \sigma^2}{|H_{ii}|^2}$$

Using the device for line management provided by the embodiment of the present invention to perform subscriber line activation does not consider the actual noise level at the moment of activation, instead, by computing and setting the reference virtual noise according to the device for line management provided by the embodiment of the present invention, the bit loading is controlled directly and enough signal-to-noise ratio is reserved to resist the crosstalk that is not generated yet. The actual effect is that the stability of the line is enhanced greatly, the time from convergence to optimal balance is reduced, and manual regulation is avoided.

Figure 5:
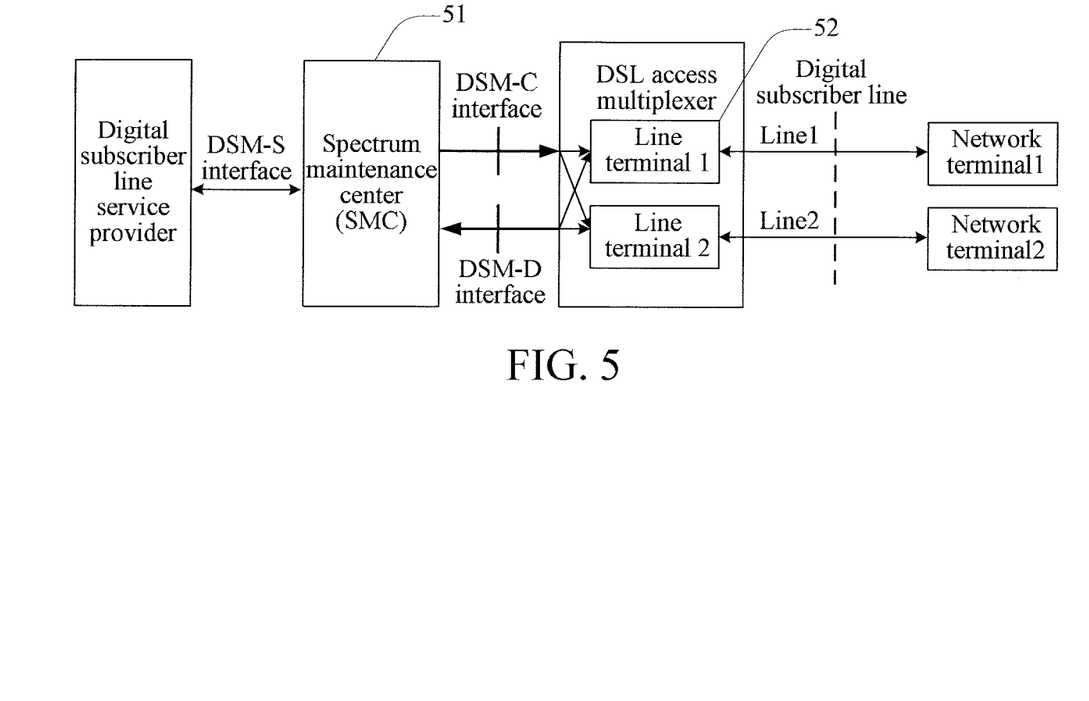
FIG. 5 is a structural view of a system for line management according to an embodiment of the present invention.

In an embodiment, the present invention further provides a system for line management, as shown in FIG. 5, the system for line management includes a line managing device 51 and line terminals 52.

The line managing device 51 may be a stand-alone device such as spectrum maintenance center (SMC), and the line terminals 52 may be provided in a DSL access multiplexer (DSLAM). The SMC and the DSLAM both include processors which can load the computer programs stored in a computer readable storage media. The processors on the SMC and the DSLAM operate respectively according to the program instructions loaded on it, and interact information to achieve the function of line management provided by the embodiments of the present invention. As shown in FIG. 5, the SMC has three interfaces, namely, DSM-S, DSM-C, and DSM-D. The SMC reads the parameters of a digital subscriber line such as working state from the line terminals 52 through the DSM-D, the parameters include the transfer function of a direct channel, the transfer function of a crosstalk channel, and the PSD of silent noise. For the DSM Level2 algorithm, the transfer function of the direct channel, the transfer function of the crosstalk channel, and the PSD of silent noise for the line terminals 52 are all known input values. The parameters may also be obtained through modeling or measuring. Information interaction is performed with associated SMC through the DSM-S interface. The SMC configures the computed reference virtual noise to the DSLAM through the DSM-C interface, and the DSLAM controls the reference virtual noise and the transmitting PSD of the transmitting end (CO/CPE) on each digital subscriber line through a template.

The line managing device 51 may also be integrated in the DSLAM, with the implementing method being basically the same as the case where the line managing device 51 and the line terminals 52 are provided in different equipments respectively. Preferably, if the line managing device 51 is integrated in the DSLAM, the line managing device 51 may configure the computed reference virtual noise to the DSLAM through an interior interface, and the DSLAM controls the reference virtual noise and the transmitting PSD of the transmitting end (CO/CPE) on each digital subscriber line through a template. Therefore, processors included in the DSLAM may load the computer programs stored in the computer readable storage media, so as to operate according to the program instructions loaded on it, thus achieving the function of line management provided by the embodiments of the present invention.

One line managing device 51 may manage several line terminals 52.

The line terminals 52 and network terminals perform activation process according to the above-mentioned reference virtual noise and the transmitting PSD.

The line managing device 51 computes the transmitting PSD and the reference virtual noise of the line terminals 52 according to the running parameters, which specifically includes the following steps.

The transmitting PSD of each subscriber is computed using a certain DSM Level2 algorithm (for example, ISB, OSB) according to the running parameters and the management target (for example, making the line terminal to achieve: rate maximization, power minimization, noise margin maximization, and any one of the optimizing strategies developed by an operator, or any combination thereof).

A receiving PSD of each line terminal is computed according to the transmitting PSD of each line terminal and the transfer function of the direct channel by using the above DSM Level2 algorithm.

Overall interfered signals of each line terminal are computed according to the transmitting PSD of each subscriber line and the transfer function of the crosstalk channel by using the above DSM Level2 algorithm.

The reference virtual noise of each subscriber is computed by using the above DSM Level2 algorithm in combination with the receiving PSD, the overall interfered signals, and the PSD of silent noise, and the process for computing the reference virtual noise is described as follows.

According to the classic QAM modulation theory, the bit loading formula of a tone for the $i^{th}$ line terminal is:

$$2^{b_i} - 1 = \frac{|H_{ii}|^2 \varepsilon_i}{\Gamma\left(\sum_{j \neq i} |H_{ij}|^2 \varepsilon_j + \sigma^2\right)}$$

In this formula, $H_{ii}$ is the transfer function of a direct channel, $H_{ij}$ is the transfer function of a crosstalk channel generated by the $j^{th}$ line terminal to the $i^{th}$ line terminal, $\varepsilon_i$ is the transmitting PSD of the $i^{th}$ line terminal, $\varepsilon_j$ is the transmitting PSD of the $j^{th}$ line terminal, $\sigma^2$ is the PSD of silent noise, and $\Gamma$ is an SNR gap. The noise floor (interference and noise) is the portion of the denominator except the SNR gap.

According to the above formula, the reference virtual noise of the $i^{th}$ subscriber line is computed as follows:

$$vnPSD = \frac{\sum_{j \neq i} |H_{ij}|^2 \varepsilon_j + \sigma^2}{|H_{ii}|^2}.$$

Using the system for line management provided by the embodiment of the present invention to perform subscriber line activation does not consider the actual noise level at the moment of activation, instead, by computing and setting the reference virtual noise according to the system for line management provided by the embodiment of the present invention, the bit loading is controlled directly and enough signal-to-noise ratio is reserved to resist the crosstalk that is not generated yet. The actual effect is that the stability of the line is enhanced greatly, the time from convergence to optimal balance is reduced, and manual regulation is avoided.

What are described in detail above are a method, device and system for line management provided by the embodiments of the present invention. Person having ordinary skill in the art can make variations and modifications to the present invention in terms of specific implementations and application scopes according to the ideas of the present invention. Therefore, the embodiments in the specification shall not be construed as limitations to the present invention.

What is claimed is:

1. A method for line management, comprising:
acquiring running parameters of a subscriber line;
computing a transmitting power spectral density, PSD, and reference virtual noise of the subscriber line according to the running parameters; and
activating the subscriber line according to the transmitting PSD and the reference virtual noise;
wherein the running parameters comprise a transfer function of a direct channel, a transfer function of a crosstalk channel, and a PSD of silent noise;
wherein the computing the reference virtual noise of the subscriber line according to the running parameters comprises specifically:
computing the transmitting PSD of the subscriber line according to the running parameters; and
computing the reference virtual noise of the subscriber line according to the transmitting PSD, the PSD of silent noise, the transfer function of the direct channel, and the transfer function of the crosstalk channel.

2. The method for line management according to claim 1, wherein the computing the transmitting PSD of the subscriber line according to the running parameters comprises:
computing the transmitting PSD of the subscriber line according to the running parameters and a management target.

3. The method for line management according to claim 2, wherein the management target is rate maximization, power minimization, noise margin maximization, or any optimizing strategy developed by an operator.

4. The method for line management according to claim 1, wherein the computing the reference virtual noise of the subscriber line according to the transmitting PSD, the PSD of silent noise, the transfer function of the direct channel, and the transfer function of the crosstalk channel comprises:
computing a receiving PSD of the subscriber line according to the transmitting PSD of the subscriber line and the transfer function of the direct channel;
computing overall interfered signals of each line according to the transmitting PSD of the subscriber line and the transfer function of the crosstalk channel; and
computing the reference virtual noise of the subscriber line according to the receiving PSD, the PSD of silent noise, and the overall interfered signals.

5. A device for line management, comprising:
a parameter acquiring unit, adapted to acquire running parameters of a subscriber line;
a computing unit, adapted to compute a transmitting power spectral density, PSD, and reference virtual noise of the subscriber line according to the running parameters; and
a line activating unit, adapted to activate the subscriber line according to the transmitting PSD and the reference virtual noise;
wherein the running parameters comprise a transfer function of a direct channel, a transfer function of a crosstalk channel, and a PSD of silent noise;
wherein the computing unit further comprises:
a first computing unit, adapted to compute the transmitting PSD of the subscriber line according to the running parameters and a management target;
a second computing unit, adapted to compute a receiving PSD of the subscriber line according to the transmitting PSD of the subscriber line and the transfer function of the direct channel;
a third computing unit, adapted to compute overall interfered signals of the subscriber line according to the transmitting PSD of the subscriber line and the transfer function of the crosstalk channel; and
a fourth computing unit, adapted to compute the reference virtual noise of the subscriber line according to the PSD of silent noise, the receiving PSD, and the overall interfered signals.

6. The method for line management according to claim 5, wherein the management target is rate maximization, power minimization, noise margin maximization, or any optimizing strategy developed by an operator.

7. A system for line management, comprising:
a line managing device, adapted to acquire running parameters of line terminals, wherein the running parameters comprise a transfer function of a direct channel, a transfer function of a crosstalk channel, and a PSD of silent noise, the line managing device further adapted to compute a transmitting PSD of a subscriber line according to the running parameters, compute a reference virtual noise of the subscriber line according to the transmitting PSD, the PSD of silent noise, the transfer function of the direct channel, and the transfer function of the crosstalk channel, and send the transmitting PSD and the reference virtual noise to the line terminals; and line terminals, adapted to send the running parameters to the line managing device, receive the transmitting PSD and the reference virtual noise sent by the line managing device, and activate the line according to the transmitting PSD and the reference virtual noise.

8. The system for line management according to claim 7, wherein, the line managing device is disposed in a spectrum management center, SMC, and the line terminals are disposed in a digital subscriber line access multiplexer, DSLAM; or the line managing device and the line terminals are both disposed in the DSLAM.

* * * * *